US012756857B2

(12) United States Patent
Chen et al.

(10) Patent No.: US 12,756,857 B2
(45) Date of Patent: *Oct. 6, 2026

(54) METHODS AND APPARATUSES FOR DECODER-SIDE MOTION VECTOR REFINEMENT IN VIDEO CODING

(71) Applicant: BEIJING DAJIA INTERNET INFORMATION TECHNOLOGY CO., LTD., Beijing (CN)

(72) Inventors: Yi-Wen Chen, San Diego, CA (US); Xiaoyu Xiu, San Diego, CA (US); Tsung-Chuan Ma, San Diego, CA (US); Xianglin Wang, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 53 days.

This patent is subject to a terminal disclaimer.

(21) Appl. No.: 18/401,127

(22) Filed: Dec. 29, 2023

(65) Prior Publication Data

US 2024/0146950 A1 May 2, 2024

Related U.S. Application Data

(63) Continuation of application No. 17/555,291, filed on Dec. 17, 2021, now Pat. No. 11,962,797, which is a (Continued)

(51) Int. Cl.
*H04N 7/12* (2006.01)
*H04N 19/132* (2014.01)
(Continued)

(52) U.S. Cl.
CPC ......... *H04N 19/513* (2014.11); *H04N 19/132* (2014.11); *H04N 19/139* (2014.11);
(Continued)

(58) Field of Classification Search
CPC .. H04N 19/513; H04N 19/132; H04N 19/139; H04N 19/176; H04N 19/189;
(Continued)

(56) References Cited

U.S. PATENT DOCUMENTS

| | | | | |
|---|---|---|---|---|
| 9,749,642 B2 * | 8/2017 | Sullivan | ............... | H04N 19/136 |
| 10,638,153 B2 * | 4/2020 | Xu | ....................... | H04N 19/169 |

(Continued)

FOREIGN PATENT DOCUMENTS

| | | |
|---|---|---|
| CN | 108293131 A1 | 7/2018 |
| CN | 109417630 A1 | 3/2019 |

(Continued)

OTHER PUBLICATIONS

Chen at al., "Algorithm description for Versatile Video Coding and Test Model 5 (VTM 5)," Mar. 19-27, 2019, JVET-N1002-v2, (75p).

(Continued)

*Primary Examiner* — Gims S Philippe
(74) *Attorney, Agent, or Firm* — Arch & Lake LLP; Hao Tan; Shen Wang

(57) ABSTRACT

A method for video encoding is provided. The method includes: partitioning, by an encoder, a video frame into multiple blocks; deriving, by the encoder, an initial motion vector (MV) of a current block in the multiple blocks; determining, by the encoder, cost values for the initial MV and each of a plurality of MV candidates; obtaining, by the encoder, updated cost values by decreasing a cost value for the initial MV or increasing cost values for the MV candidates; and deriving, by the encoder a refined MV based on the updated cost values.

19 Claims, 6 Drawing Sheets

Related U.S. Application Data continuation of application No. PCT/US2020/038253, filed on Jun. 17, 2020.

(60) Provisional application No. 62/862,674, filed on Jun. 17, 2019.

(51) Int. Cl.

| | |
|---|---|
| ***H04N 19/139*** | (2014.01) |
| ***H04N 19/176*** | (2014.01) |
| ***H04N 19/189*** | (2014.01) |
| ***H04N 19/44*** | (2014.01) |
| ***H04N 19/513*** | (2014.01) |

(52) U.S. Cl.

CPC ......... *H04N 19/176* (2014.11); *H04N 19/189* (2014.11); *H04N 19/44* (2014.11)

(58) Field of Classification Search

CPC .... H04N 19/44; H04N 19/521; H04N 19/523; H04N 19/567; H04N 19/119; H04N 19/105

See application file for complete search history.

(56) References Cited

U.S. PATENT DOCUMENTS

| | | | | |
|---|---|---|---|---|
| 11,750,832 | B2* | 9/2023 | Su | H04N 19/513 375/240.16 |
| 2006/0159176 | A1 | 7/2006 | Park | |
| 2006/0222074 | A1 | 10/2006 | Zhang et al. | |
| 2007/0286286 | A1* | 12/2007 | Heng | H04N 19/40 375/E7.092 |
| 2010/0316118 | A1 | 12/2010 | Li et al. | |
| 2011/0310295 | A1 | 12/2011 | Chen | |
| 2012/0075535 | A1* | 3/2012 | Van Beek | H04N 5/145 348/E5.062 |
| 2015/0382012 | A1* | 12/2015 | Hussain | H04N 19/176 375/240.16 |
| 2018/0184117 | A1 | 6/2018 | Chen | |
| 2018/0199057 | A1* | 7/2018 | Chuang | H04N 19/573 |
| 2018/0249154 | A1 | 8/2018 | Chuang et al. | |
| 2018/0278949 | A1 | 9/2018 | Karczewicz | |
| 2018/0359483 | A1 | 12/2018 | Chen | |
| 2019/0020895 | A1 | 1/2019 | Liu et al. | |
| 2019/0132606 | A1 | 5/2019 | Su et al. | |
| 2019/0208223 | A1* | 7/2019 | Galpin | H04N 19/52 |
| 2020/0045330 | A1 | 2/2020 | Lin et al. | |
| 2020/0236398 | A1 | 7/2020 | Esenlik | |
| 2020/0275112 | A1 | 8/2020 | Chiang | |
| 2020/0314445 | A1 | 10/2020 | Park | |
| 2020/0413040 | A1 | 12/2020 | Lim | |
| 2021/0084322 | A1 | 3/2021 | Chen | |
| 2022/0116648 | A1 | 4/2022 | Sethuraman | |
| 2022/0150507 | A1* | 5/2022 | Lin | H04N 19/577 |
| 2022/0167004 | A1* | 5/2022 | Chen | H04N 19/14 |
| 2023/0045157 | A1* | 2/2023 | Park | H04N 19/463 |
| 2024/0291998 | A1* | 8/2024 | Park | H04N 19/109 |

FOREIGN PATENT DOCUMENTS

| | | | |
|---|---|---|---|
| CN | 109672894 | A | 4/2019 |
| EP | 3264768 | A1 | 1/2018 |
| KR | 20080048384 | A | 6/2008 |
| WO | 2015105662 | A1 | 7/2015 |
| WO | 2017036414 | A1 | 3/2017 |
| WO | 2018002021 | A1 | 1/2018 |
| WO | 2018130206 | A1 | 7/2018 |
| WO | 2019065444 | A1 | 4/2019 |
| WO | 2019072373 | A1 | 4/2019 |
| WO | 2019085892 | A1 | 5/2019 |
| WO | 2019110132 | A1 | 6/2019 |

OTHER PUBLICATIONS

International Search Report of International Application No. PCT/US2020/038253 dated Sep. 28, 2020, (3p).

Chujoh,Takeshi et al., CE9:An earty termination of DMVR (Test 9.2.5),Joint Video Experts Team (JVET)of ITU-T SG 16 WP 3 and ISO/IEC JTC 1/SC 29/WG11,JVET-M0062-v1,13th Meeting:Marrakech,MA, Jan. 9, 18, 2019 (3p).

Sethuraman,Sriram, “CE9-related:Using extended samples during DMVR SAD cost evaluations”,Joint Video Experts Team (JVET)of ITU-T SG 16 WP 3 and ISO/IEC JTC 1/SC 29WG11,JVET-N0295-v2,14th Meeting: Geneva,CH, Mar. 19-27, 2019, (5p).

Chen,Xu et al., “CE 9:DMVR Simplifications (Test 9.2.3)”,Joint Video Experts Team (JVET)of ITU-T SG 16 WP 3 and ISO/IEC JTC 1/SC 29WG 11,JVET-M0306,13th Meeting:Marrakech,MA, Jan. 9-18, 2019, (4p).

Chen,Yi-Wen et al, “Non-CE9: Improvement of DMVR”,Joint Video Experts Team (JVET)of ITU-T SG 16 WP 3 and ISO/IEC JTC 1/SC 29WG11,JVET-00590,15th Meeting:Gothenburg,SE, Jul. 3-12, 2019, (2p).

Chen,Jianle et al,JVET, “Algorithm description of Joint Exploration Test Model 6 (JEM6)” of ITU-T SG 16 WP 3 and SO/IEC JTC 1/SC 29WG 11,JVET-F1001-v3,6th Meeting:Hobart,AU, Mar. 31-Apr. 7, 2017, (48p).

Esenlik,Semih et al.,JVET, “CE9:DMVR with Bilateral Matching(Test2.9)” of ITU-T SG 16 WP 3 and ISO/IEC JTC 11 SC 29WG 11,JVET-K0217_v1,11th Meeting:Ljubljana,SI, Jul. 10-18, 2018, (5p).

European Search Report in Application No. 20825992.9, dated Jul. 11, 2022, (15p).

* cited by examiner

METHODS AND APPARATUSES FOR DECODER-SIDE MOTION VECTOR REFINEMENT IN VIDEO CODING

CROSS-REFERENCE TO RELATED APPLICATION

The present application is a continuation application of U.S. application Ser. No. 17/555,291, filed on Dec. 17, 2021, which is a continuation application of International Application No. PCT/US2020/038253, filed on Jun. 17, 2020, which is based upon and claims priority to U.S. Provisional Application No. 62/862,674, entitled "Decoder-side Motion Vector Refinement for Video Coding," filed on Jun. 17, 2019, the entire contents of which are incorporated by reference in their entireties for all purposes.

FIELD

The present application generally relates to video coding and compression, and in particular but not limited to, methods and apparatuses for Decoder-side Motion Vector Refinement (DMVR) in video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression. Digital video devices implement video coding techniques, such as those described in the standards defined by Versatile Video Coding (VVC), Joint Exploration Test Model (JEM), MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards.

Video coding generally utilizes prediction methods (e.g., inter-prediction, intra-prediction) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). A CTU may be split into coding units (CUs) using a quadtree with a nested multi-type tree structure, with a CU defining a region of pixels sharing the same prediction mode. Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in intra, inter or IBC modes. Video blocks in an intra coded (I) slice of a video frame are encoded using spatial prediction with respect to reference samples in neighbor blocks within the same video frame.

Video blocks in an inter coded (P or B) slice of a video frame may use spatial prediction with respect to reference samples in neighbor blocks within the same video frame or temporal prediction with respect to reference samples in other previous and/or future reference video frames.

In some examples of the present disclosure, the term 'unit' defines a region of an image covering all components such as luma and chroma; the term 'block' is used to define a region covering a particular component (e.g. luma), and the blocks of different components (e.g. luma vs. chroma) may differ in spatial location when considering the chroma sampling format such as 4:2:0.

Spatial or temporal prediction based on a reference block that has been previously encoded, e.g., a neighbor block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of video data to be encoded/decoded grows exponentially. It is a constant challenge in terms of how the video data can be encoded/decoded more efficiently while maintaining the image quality of the decoded video data.

SUMMARY

In general, this disclosure describes examples of techniques relating to decoder-side motion vector refinement (DMVR) in video coding.

According to a first aspect of the present disclosure, there is provided a method for video encoding, including: partitioning, by an encoder, a video frame into multiple blocks; deriving, by the encoder, an initial motion vector (MV) of a current block in the multiple blocks; determining, by the encoder, cost values for the initial MV and each of a plurality of MV candidates; obtaining, by the encoder, updated cost values by decreasing a cost value for the initial MV or increasing cost values for the MV candidates; and deriving, by the encoder a refined MV based on the updated cost values.

According to a second aspect of the present disclosure, there is provided an apparatus for video coding, including: one or more processors; and a memory configured to store instructions executable by the one or more processors; where the one or more processors, upon execution of the instructions, are configured to: partition a video frame into multiple blocks; derive an initial motion vector (MV) of a current block in the multiple blocks; determine cost values for the initial MV and each of a plurality of MV candidates; obtain updated cost values by decreasing a cost value for the initial MV or increasing cost values for the MV candidates; and derive a refined MV based on the updated cost values.

According to a third aspect of the present disclosure, there is provided a non-transitory computer readable storage medium, including instructions stored therein, where, upon execution of the instructions by one or more processors, the instructions cause the one or more processors to perform acts including: partitioning a video frame into multiple blocks; deriving an initial motion vector (MV) of a current block in the multiple blocks; determining cost values for the initial MV and each of a plurality of MV candidates; obtaining updated cost values by decreasing a cost value for the initial MV or increasing cost values for the MV candidates; and deriving a refined MV based on the updated cost values.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g. devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
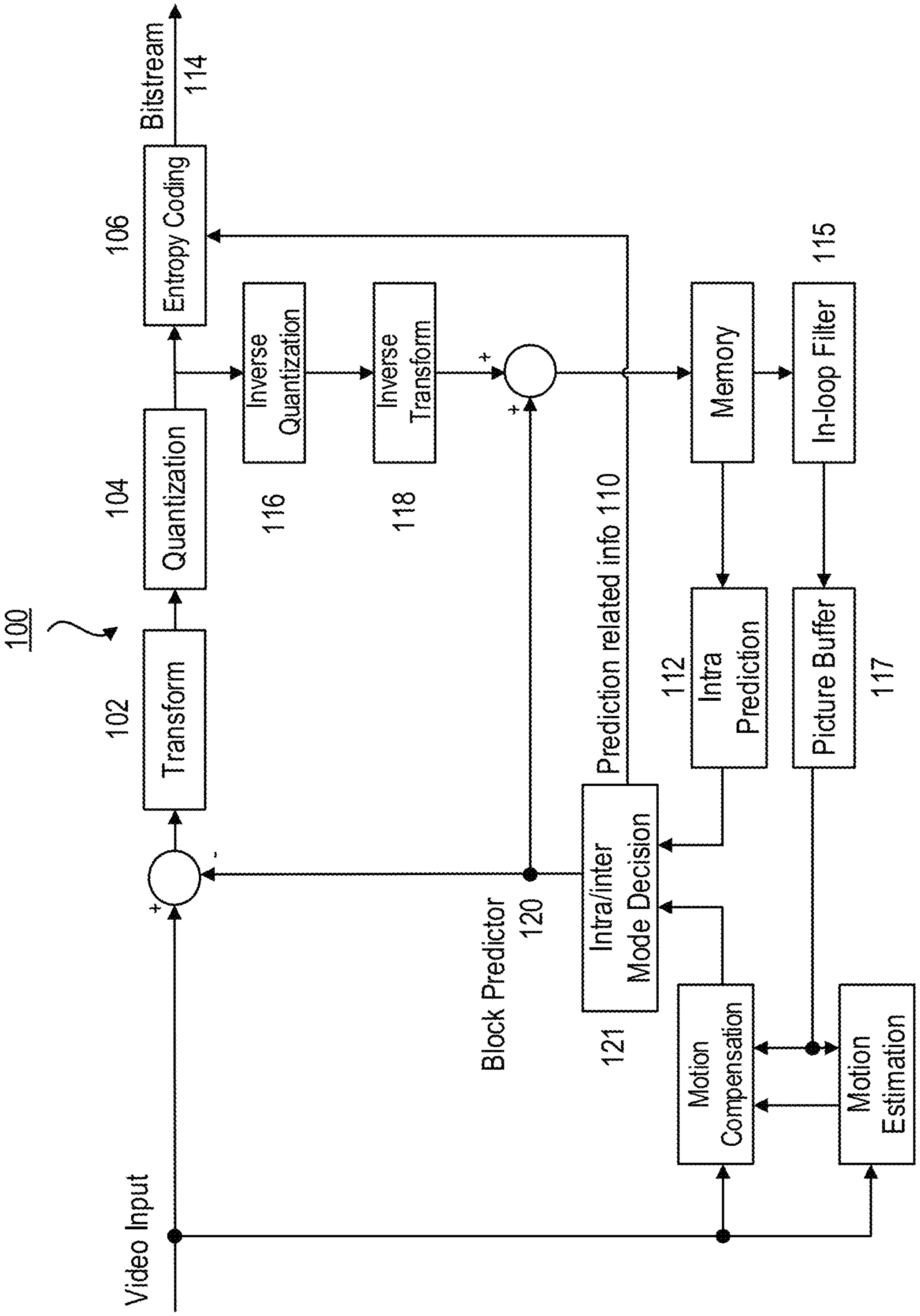
FIG. 1 is a block diagram illustrating an exemplary video encoder in accordance with some implementations of the present disclosure.

FIG. 1 shows a block diagram illustrating an exemplary block-based hybrid video encoder 100 which may be used in conjunction with many video coding standards using block-based processing. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. Temporal prediction signal for a given coding unit (CU) or coding block is usually signaled by one or more motion vectors (MVs) which indicate the amount and the direction of motion between the current CU and its temporal reference. Further, if multiple reference pictures are supported, one reference picture index is additionally sent, which is used to identify from which reference picture in the reference picture store the temporal prediction signal comes.

After spatial and/or temporal prediction is performed, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO (sample adaptive offset) is defined to further improve coding efficiency. Another in-loop filter called ALF (adaptive loop filter) is being actively investigated.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
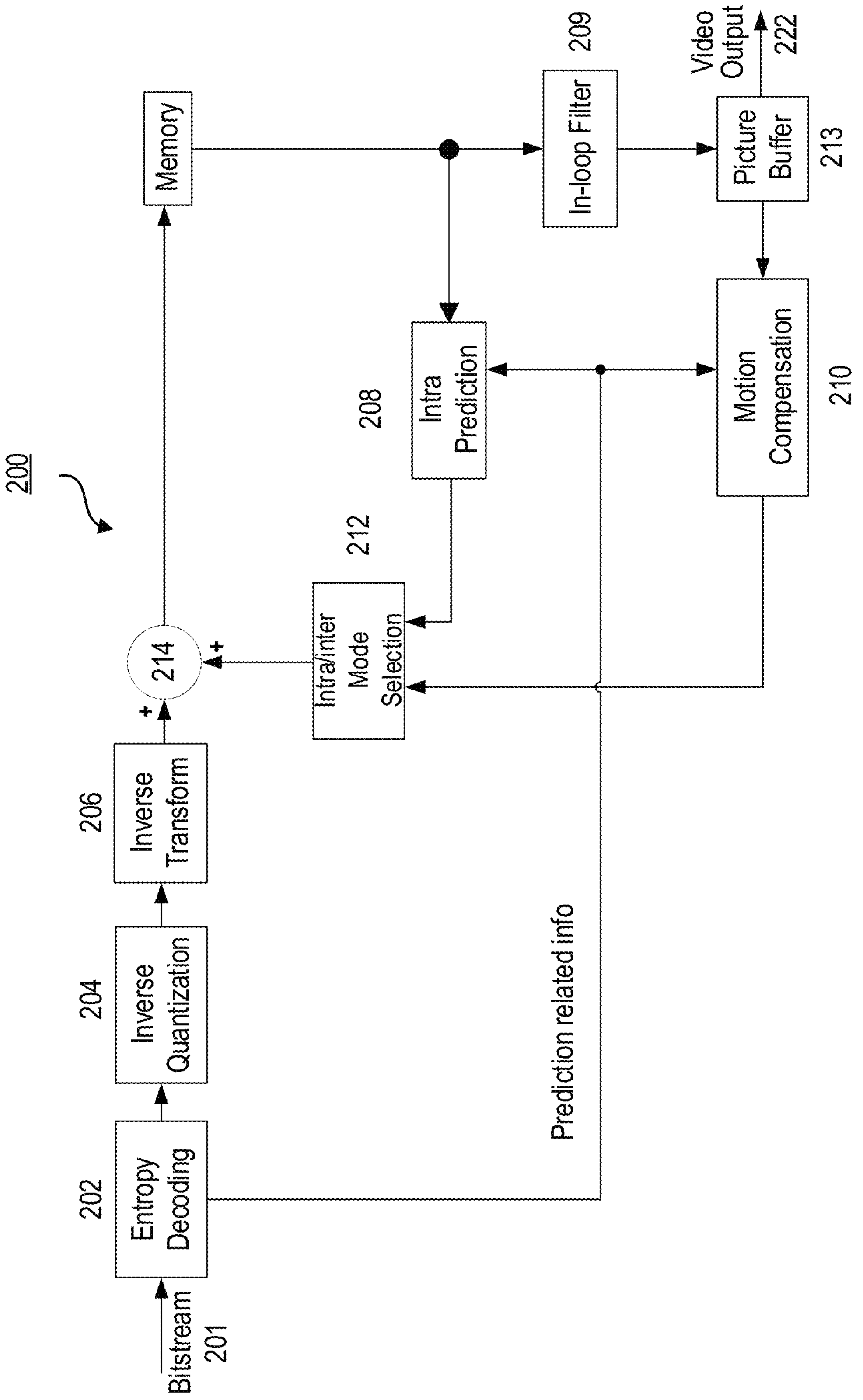
FIG. 2 is a block diagram illustrating an exemplary video decoder in accordance with some implementations of the present disclosure.

FIG. 2 is a block diagram illustrating an exemplary block-based video decoder 200 which may be used in conjunction with many video coding standards. This decoder 200 is similar to the reconstruction-related section residing in the encoder 100 of FIG. 1. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

Video coding/decoding standards mentioned above, such as VVC, JEM, HEVC, MPEG-4, Part 10, are conceptually similar. For example, they all use block-based processing. In a Joint Video Experts Team (JVET) meeting, the JVET defined the first draft of the Versatile Video Coding (VVC) and the VVC Test Model 1 (VTM1) encoding method. It was decided to include a quadtree with nested multi-type tree using binary and ternary splits coding block structure as the initial new coding feature of VVC.

Decoder-Side Motion Vector Refinement (DMVR) in VVC

Decoder-side Motion Vector Refinement (DMVR) is a technique for blocks coded in bi-prediction Merge mode. Under this mode, the two motion vectors (MV) of the block can be further refined using bilateral matching (BM) prediction.

Figure 3:
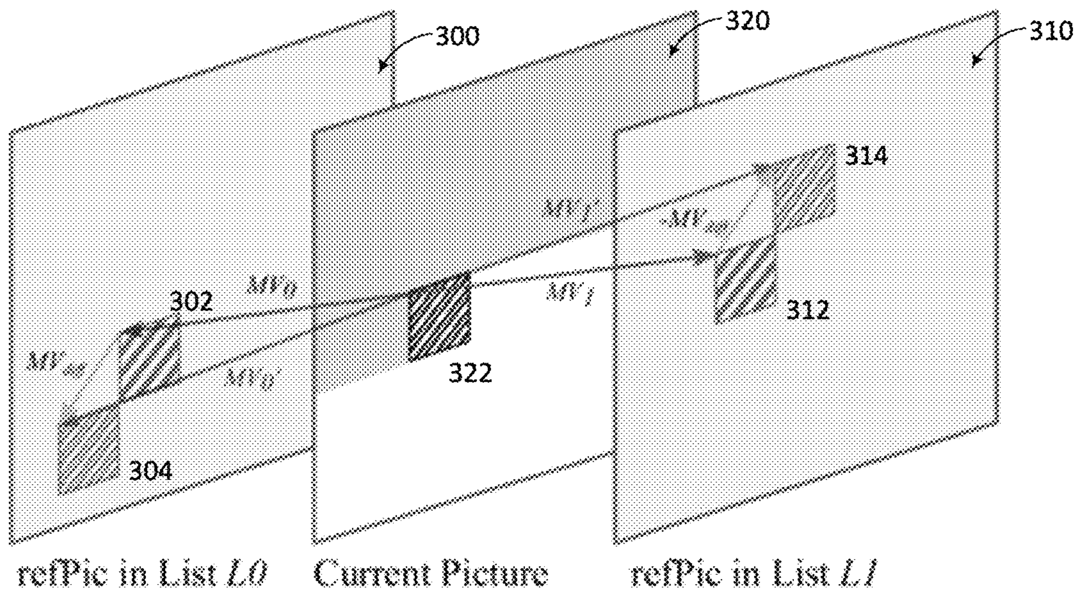
FIG. 3 is a schematic diagram illustrating an example of decoder-side motion vector refinement (DMVR) in accordance with some implementations of the present disclosure.

FIG. 3 is a schematic diagram illustrating an example of decoder-side motion vector refinement (DMVR). As shown in the FIG. 3, the bilateral matching method is used to refine motion information of a current CU 322 by searching the closest match between its two reference blocks 302, 312 along the motion trajectory of the current CU in its two associated reference pictures, i.e. refPic in List L0 300 and refPic in List L1 310. The patterned rectangular blocks 322, 302, and 312, indicate the current CU and its two reference blocks based on the initial motion information from Merge mode. The patterned rectangular blocks 304, 314 indicate one pair of reference blocks based on a MV candidate used in the motion refinement search process, i.e. motion vector refinement process.

The MV differences between the MV candidate, i.e. MV0' and MV1', and the initial MV, i.e. MV0 and MV1 (also called the original MV), are MVdiff and −MVdiff, respectively. The MV candidate and the initial are both bi-directional motion vectors. During DMVR, a number of such MV candidates around the initial MV may be checked. Specifically, for each given MV candidate, its two associated reference blocks may be located in its reference pictures in List 0 and List 1 respectively, and the difference between them may be calculated.

The block difference may also be referred to as a cost value, and is usually measured in sum of absolute differences (SAD), or row-subsampled SAD (i.e. the SAD calculated with every other row of the block involved). In some other examples, mean-removed SAD, or sum of squared differences (SSD) may also be used as the cost value. The MV candidate with the lowest cost value, or SAD, between its two reference blocks becomes the refined MV and is used to generate the bi-predicted signal as the actual prediction for the current CU.

In VVC, the DMVR is applied to a CU that satisfies the following conditions:

- The CU is coded with CU level merge mode (not sub-block merge mode) with bi-prediction MV;
- With respect to the current picture, one reference picture of the CU is in the past (i.e. with a POC smaller than the current picture POC) and the other reference picture is in the future (i.e. with a POC greater than the current picture POC);
- The POC distances (i.e. absolute POC difference) from both reference pictures to the current picture are the same; and
- The CU has more than 64 luma samples in size and the CU height is more than 8 luma samples.

The refined MV derived by the DMVR process is used to generate the inter prediction samples and also used in temporal motion vector prediction for future picture coding. While the original MV is used in deblocking process and also in spatial motion vector prediction for future CU coding.

Searching Scheme in DMVR

As shown in FIG. 3, the MV candidates (or search points) are surrounding the initial MV, with the MV offset obeying the MV difference mirroring rule. In other words, any points that are checked by DMVR, denoted by candidate MV pair (MV0, MV1), obey the following two equations:

$$MV0' = MV0 + MV_{diff}$$

$$MV1' = MV1 - MV_{diff},$$

where $MV_{diff}$ represents the refinement offset between the initial MV and the refined MV in one of the reference pictures. In current VVC, the refinement search range is two integer luma samples from the initial MV.

Figure 4:
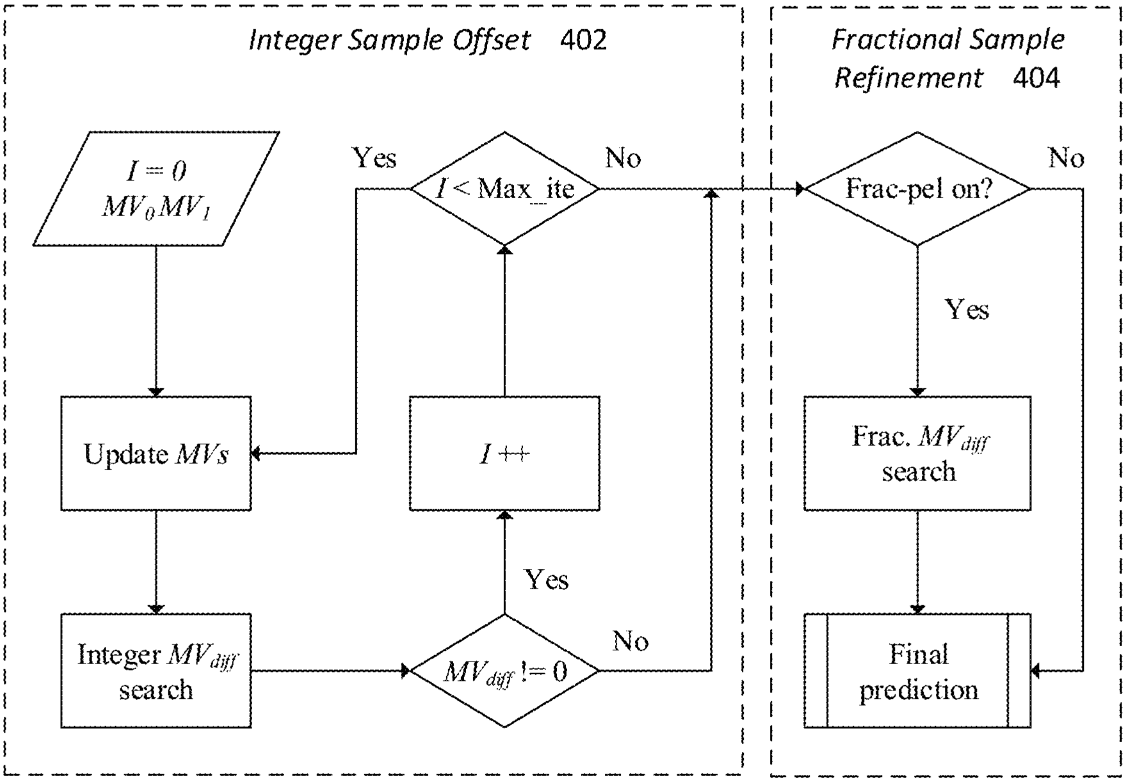
FIG. 4 is a schematic diagram illustrating an example of a DMVR searching procedure in accordance with some implementations of the present disclosure.

FIG. 4 illustrates an example of the searching process of DMVR. As shown in FIG. 4, the searching process includes the integer sample offset search stage 402 and the fractional sample refinement stage 404.

Figure 5:
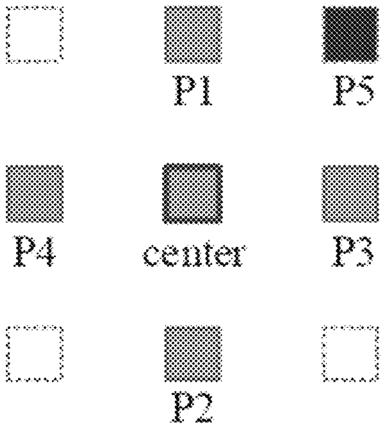
FIG. 5 is a schematic diagram illustrating an example of DMVR integer luma sample searching pattern in accordance with some implementations of the present disclosure.

To reduce the search complexity, a fast searching method with early termination mechanism is applied in the integer sample offset search stage 402. Instead of a 25 points full search, a 2-iteration search scheme is applied to reduce the number of SAD checking points. FIG. 5 illustrates an example of DMVR integer luma sample searching pattern for the integer sample offset search stage 402. Each rectangular box in FIG. 5 represents a point (MV). As shown in FIG. 5, a maximum of 6 SADs (SADs for Center and P1~P5) are checked in the first iteration according to the fast search method. In the first iteration, the initial MV is Center. First, the SADs of the five points (Center and P1~P4) are compared. If the SAD of Center (i.e. the center position) is smallest, the integer sample offset search stage 402 of DMVR is terminated. Otherwise, one more position P5 (determined based on the SAD distribution of P1~P4), is checked. Then, the position (among P1~P5) with the smallest SAD is selected as the center position of the second iteration search. The process of the second iteration search is the same as that of the first iteration search. The SADs calculated in the first iteration may be re-used in the second iteration, and therefore SADs of only 3 additional points may need to be calculated in the second iteration. It is noted that when the SAD of the center point in the first iteration is smaller than the number of samples used to calculate the SAD (which is equal to w*h/2, where w and h represent the width and height of the DMVR operation unit, respectively), the whole DMVR process is early terminated without further search.

The integer sample search 402 is followed by the fractional sample refinement 404. To reduce calculation complexity, the fractional sample refinement 404 is derived using parametric error surface equation, instead of additional search with SAD comparison. The fractional sample refinement 404 is conditionally invoked based on the output of the integer sample search stage. When the integer sample search stage 402 is terminated with the center having the smallest SAD in either the first iteration or the second iteration search, the fractional sample refinement is further applied.

In parametric error surface based fractional sample refinement, the SAD costs (or cost values) of the center position and its four neighboring positions are used to fit a 2-D parabolic error surface equation of the following form:

$$E(x,y) = A(x - x_{min})^2 + B(y - y_{min})^2 + C,$$

where $(x_{min}, y_{min})$ corresponds to the fractional position with the least SAD cost and C corresponds to the minimum cost value. By solving the above equations using the SAD cost values of the five search points, the $(x_{min}, y_{min})$ may be derived by:

$$x_{min} = (E(-1, 0) - E(1, 0))/(2(E(-1, 0) + E(1, 0) - 2E(0, 0))) \quad (1)$$

$$y_{min} = (E(0, -1) - E(0, 1))/(2((E(0, -1) + E(0, 1) - 2E(0, 0))) \quad (2)$$

The solver of $(x_{min}, y_{min})$ may be defined by a division-free process as illustrated in Table 1 and Table 2 below. In the process, the values of E(−1,0) and E(0,−1) are substituted into sadMinus when solving equations (1) and (2), respectively; E(1,0) and E(0,1) are substituted into sadPositive when solving equations (1) and (2), respectively; E(0,0) is substituted into sadCenter. The output of this process dMvC is the solution $x_{min}$ or $y_{min}$ when deriving the equation (1) or (2), respectively.

TABLE 1

Process for obtaining $x_{min}$ or $y_{min}$

```
denom = ( ( sadMinus + sadPlus ) − ( sadCenter << 1 ) ) << 3
if ( denom = = 0 )
  dMvC = 0
else {
  if (sadMinus = = sadCenter )
    dMvC = −8
  else if (sadPlus = = sadCenter )
    dMvC = 8
  else {
      division-free equation solver( )
  }
}
```

TABLE 2

| Division-free equation solver( ) to solve equations (1) and (2) |
| --- |

```
num = ( sadMinus − sadPlus ) << 4
signNum = 0
if ( num < 0 ) {
   num = −num
   signNum = 1
}
quotient = 0
counter = 3
while ( counter > 0 ) {
   counter = counter − 1
   quotient = quotient << 1
   if ( num >= denom ) {
      num = num − denom
      quotient = quotient + 1
   }
   denom = (denom >> 1)
}
if (signNum = = 1)
   dMvC = −quotient
else
   dMvC = quotient
```

The values of $x_{min}$ and $y_{min}$ are further constrained to be between −8 and 8, which corresponds to half-pel offset from the center point with 1/16th-pel MV accuracy. The computed fractional offset ($x_{min}$, $y_{min}$) is added to the integer distance MV refinement to get the sub-pixel accuracy MV refinement.

Bilinear-Interpolation and Sample Padding for DMVR

In VVC, the resolution of the MVs is 1/16 luma samples. The samples at the fractional position are interpolated using an 8-tap interpolation filter. In DMVR search, when a candidate MV points to a sub-pel location, those related fractional position samples need to be interpolated. To reduce the calculation complexity, the bi-linear interpolation filter is used to generate the fractional samples in the searching process in DMVR.

Another effect from using bi-linear filter for interpolation is that with a 2-sample search range, the DVMR search process does not access more reference samples compared to the normal motion compensation process. After the refined MV is attained by the DMVR search process, the normal 8-tap interpolation filter is applied to generate the final prediction. Again, in this 8-tap interpolation process, sample padding is used to avoid accessing more reference samples than normal motion compensation process. More specifically, in the 8-tap interpolation process based on a refine MV, samples that are beyond those needed for the motion compensation based on the original MV will be padded from their neighboring available samples.

Maximum DMVR Processing Unit

When the width and/or height of a CU are larger than 16 luma samples, the DMVR operation for the CU is performed based on DMVR processing units with maximum width and/or height equal to 16 samples. In other words, in such case, the original CU is partitioned into sub-blocks with width and/or height equal to 16 luma samples for DMVR operation. The maximum processing unit size for the DMVR searching process is limited to 16×16.

In the current VVC design, there is no control flag to control the enabling of the DMVR. However, it is not guaranteed that the DMVR refined MV is always better than the one before the refinement. In some cases, the DMVR refinement process may produce a refined MV that is worse than the original one. According to some examples of the present disclosure, several methods are proposed to reduce the penalty resulted from such uncertainty of DMVR MV refinement.

Updated Cost Values for DMVR by Adjusting Cost Value(s)

Several exemplary approaches are proposed to favor the original MV during the DMVR process. It is noted that these different approaches may be applied independently or jointly.

The terms "initial MV" and "original MV" may be used interchangeably in some examples of the present disclosure.

In some examples, during the DMVR process, the cost values for the initial MV and each of the MV candidates may be adjusted or updated to favor the initial MV. That is, after the calculation of cost values (e.g., SADs) of the searching points in the DMVR process, the cost value(s) may be adjusted to increase the probability of the initial MV having the least cost value among the updated cost values, i.e. to favor the initial MV.

Thus, after the updated cost values are obtained, the initial MV has a higher chance of being selected as the MV with lowest cost during the DMVR process.

Here, the SAD values are used as an exemplary cost value for illustrative purpose. Other values, such as row-subsampled SAD, mean-removed SAD, or sum of squared difference (SSD), may also be used as the cost values.

In some examples, the SAD value between the reference blocks referred by the initial MV (or original MV) is decreased by a first value OffsetSAD calculated through a predefined process compared against the SAD values of other MV candidates. Therefore, the initial MV is favored relative to other candidate MVs since its SAD value is decreased.

In one example, the value of OffsetSAD may be determined as 1/N of the SAD value associated with the initial MV, where N is an integer (e.g. 4, 8 or 16).

In another example, the value of OffsetSAD may be determined as a constant value M.

In yet another example, the value of OffsetSAD may be determined according to coded information in the current CU, the coded information including at least one or a combination of: coding block size, magnitude of motion vectors, the SAD of the initial MV, and relative position of a DMVR process unit. For example, the value of OffsetSAD may be determined as 1/N of the SAD value associated with the initial MV, where N is an integer value (e.g. 4, 8 or 16) chosen based on the block size of the current CU. When the current block size is larger than or equal to a predefined size (e.g. 16×16), the value of N is set to 8; otherwise, the value of N is set to 4. For example, the value of OffsetSAD may be determined as 1/N of the SAD value associated with the initial MV, where N is an integer value (e.g. 4, 8 or 16) chosen based on the distance between the center position of the DMVR process unit and the center position of current CU. When the distance is larger than or equal to a predefined threshold, N is set to one value (e.g. 8); otherwise, N is set to another value (e.g. 4).

In the examples, decreasing the SAD value associated with the initial MV by a certain value OffsetSAD is described. In practice, the idea may be implemented differently. For example, instead of decreasing the SAD value associated with the initial MV, the value of OffsetSAD may be added to those SADs associated with other MV candidates during DMVR search process, and the results in these two cases are equivalent.

In some other examples, the SAD values between the reference blocks referred by the non-initial MV candidates are increased by a second value OffsetSAD' calculated through a predefined process. The second value OffsetSAD' and the first value OffsetSAD may be the same or different.

Therefore, the initial MV is favored since the SAD values of the non-initial MVs are increased.

In one example, the value of OffsetSAD' may be determined as 1/N of the SAD value associated with the non-initial MV, where N is an integer (e.g. 4, 8 or 16).

In another example, the value of OffsetSAD' may be determined as a constant value M.

In yet another example, the value of OffsetSAD' may be determined according to coded information in the current CU, which may include coding block size, the magnitude of the motion vectors, the SAD value of the non-initial MVs, and/or the relative position of DMVR process unit within the current CU. For example, this value may be determined as 1/N of the SAD value from the BM using the non-initial MV, where N is an integer (e.g. 4, 8 or 16) chosen based on block size. When the current block size is larger than or equal to a predefined size (e.g. 16×16), the value of N is set to 8; otherwise, the value of N is set to 4. For example, the value of OffsetSAD' may be determined as 1/N of the SAD value from the BM using the non-initial MV, where N is an integer value (e.g. 4, 8 or 16) chosen based on the distance between the center position of the DMVR process unit and the center position of current CU. When the distance is larger than or equal to a predefined threshold, N is set to one value (e.g. 8); otherwise, N is set to another value (e.g. 4).

In the examples, increasing the SAD value associated with the non-initial MV candidates by a certain value OffsetSAD' is described. In practice, the idea may be implemented differently. For example, instead of increasing the SAD value associated with the non-initial MV, the value of OffsetSAD' may be subtracted from the SAD associated with the initial MV during the DMVR search process, and the results are equivalent.

In some further examples, the BM SAD associated with the initial MV is calculated based on a proper subset of the samples used for SAD calculation associated with the non-initial MVs. That is, the SAD value of the initial MV is determined using fewer samples compared with the SAD values of the MV candidates. This may be similar to decreasing the SAD value of the initial MV.

In some other examples, the process for deriving or obtaining $x_{min}$ and $y_{min}$ for the parametric error surface based fractional sample refinement is simplified by removing the comparison between the sadMinus and sadCenter and the one between sadPlus and sadCenter which are respectively marked between double hashtags, as illustrated in Table 3. That is, in deriving the refined MV, the fractional sample refinement is simplified by removing comparison between sadMinus and sadCenter and comparison between sadPlus and sadCenter; where sadMinus represents a value of E(−1,0) or E(0,−1), sadPlus represents a value of E(1,0) or E(0,1), and sadCenter represents a value of E(0,0), in solving the 2-D parabolic equation:

$$E(x,y)=A(x-x_{min})^2+B(y-y_{min})^2+C.$$

TABLE 3

Simplified process for obtaining $x_{min}$ or $y_{min}$

```
denom = ( ( sadMinus + sadPlus ) − ( sadCenter << 1 ) ) << 3
if ( denom = = 0 )
  dMvC = 0
else {
  ##if (sadMinus = = sadCenter )##
    ##dMvC = −8##
  ##else if (sadPlus = = sadCenter ) ##
    ##dMvC = 8##
  ##else {##
      division-free equation solver( )
  ##}##
}
```

In some other examples, the process for obtaining $x_{min}$ and $y_{min}$ for the parametric error surface based fractional sample refinement is simplified by decreasing the limits of $x_{min}$ and $y_{min}$ by limiting the dMvC to −4 or 4 for the corner cases as illustrated in Table 4 and by reducing the value of the iteration counter to 2 (e.g. the value of the counter is initialized to 2) as illustrated in Table 5.

TABLE 4

Process for obtaining $x_{min}$ or $y_{min}$

```
denom = ( ( sadMinus + sadPlus ) − ( sadCenter << 1 ) ) << 3
if ( denom = = 0 )
  dMvC = 0
else {
  if (sadMinus = = sadCenter )
    dMvC = −4
  else if (sadPlus = = sadCenter )
    dMvC = 4
  else {
      division-free equation solver( )
  }
}
```

TABLE 5

Modified division-free equation solver( ) to solve equations (1) and (2)

```
num = ( sadMinus − sadPlus ) << 4
signNum = 0
if ( num < 0 ) {
  num = −num
  signNum = 1
}
quotient = 0
counter = 2
while ( counter > 0 ) {
  counter = counter − 1
  quotient = quotient << 1
  if ( num >= denom ) {
    num = num − denom
    quotient = quotient + 1
  }
  denom = (denom >> 1)
}
if (signNum = = 1)
  dMvC = −quotient
else
  dMvC = quotient
```

According to above examples, the DMVR process is modified such that the initial MV is favored compared to the other MV candidates in the integer sample offset search stage and/or the fractional sample refinement stage, thereby reducing the penalty resulted from the possible scenario that the refined MV is worse than the original MV.

Figure 6:
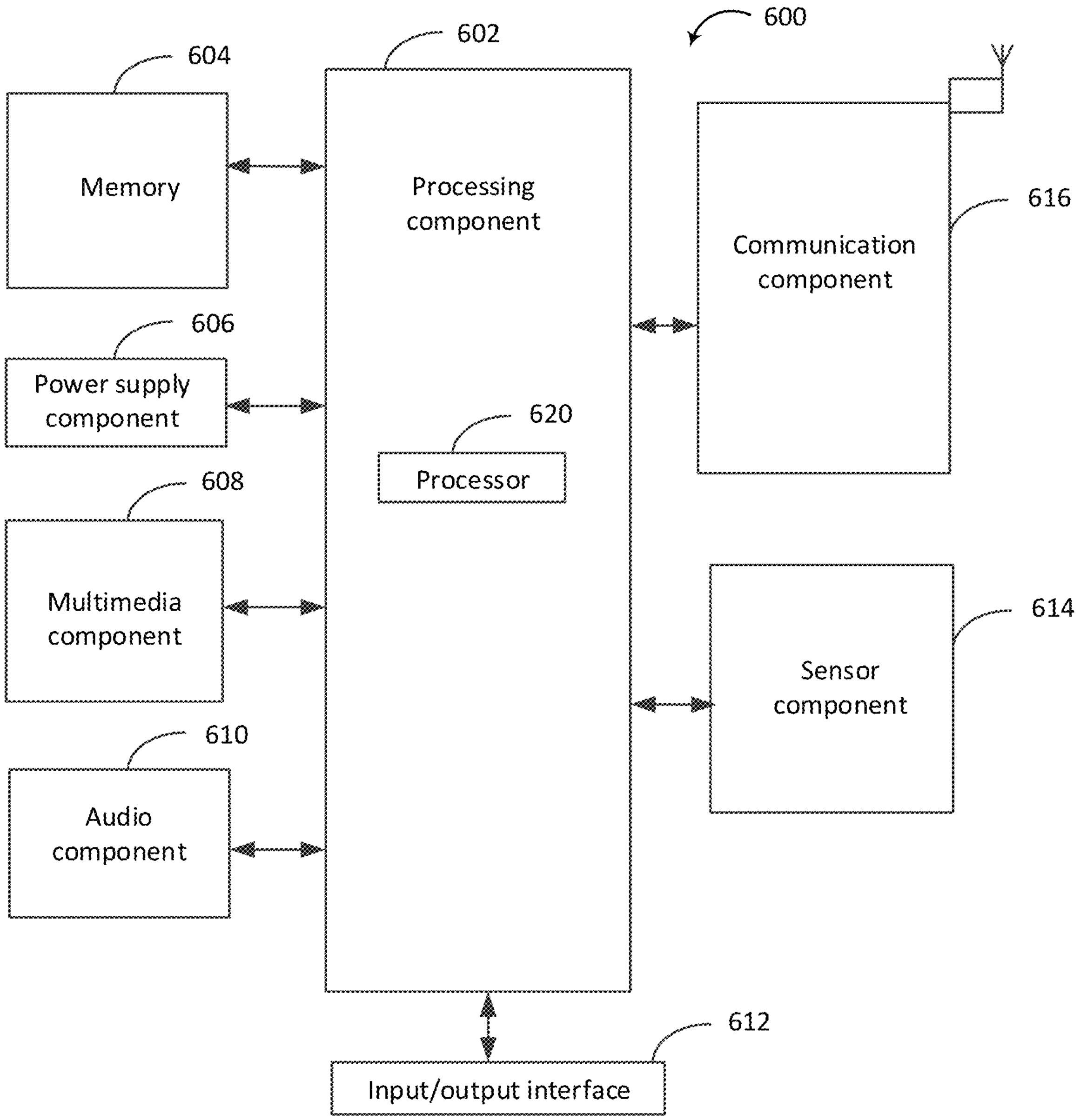
FIG. 6 is a block diagram illustrating an exemplary apparatus for video coding in accordance with some implementations of the present disclosure.

FIG. 6 is a block diagram illustrating an exemplary apparatus for video coding in accordance with some implementations of the present disclosure. The apparatus 600 may be a terminal, such as a mobile phone, a tablet computer, a digital broadcast terminal, a tablet device, or a personal digital assistant.

As shown in FIG. 6, the apparatus 600 may include one or more of the following components: a processing component 602, a memory 604, a power supply component 606, a multimedia component 608, an audio component 610, an input/output (I/O) interface 612, a sensor component 614, and a communication component 616.

The processing component 602 usually controls overall operations of the apparatus 600, such as operations relating to display, a telephone call, data communication, a camera operation and a recording operation. The processing component 602 may include one or more processors 620 for executing instructions to complete all or a part of steps of the above method. Further, the processing component 602 may include one or more modules to facilitate interaction between the processing component 602 and other components. For example, the processing component 602 may include a multimedia module to facilitate the interaction between the multimedia component 608 and the processing component 602.

The memory 604 is configured to store different types of data to support operations of the apparatus 600. Examples of such data include instructions, contact data, phonebook data, messages, pictures, videos, and so on for any application or method that operates on the apparatus 600. The memory 604 may be implemented by any type of volatile or non-volatile storage devices or a combination thereof, and the memory 604 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 606 supplies power for different components of the apparatus 600. The power supply component 606 may include a power supply management system, one or more power supplies, and other components associated with generating, managing and distributing power for the apparatus 600.

The multimedia component 608 includes a screen providing an output interface between the apparatus 600 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 608 may include a front camera and/or a rear camera. When the apparatus 600 is in an operation mode, such as a shooting mode or a video mode, the front camera and/or the rear camera may receive external multimedia data.

The audio component 610 is configured to output and/or input an audio signal. For example, the audio component 610 includes a microphone (MIC). When the apparatus 600 is in an operating mode, such as a call mode, a recording mode and a voice recognition mode, the microphone is configured to receive an external audio signal. The received audio signal may be further stored in the memory 604 or sent via the communication component 616. In some examples, the audio component 610 further includes a speaker for outputting an audio signal.

The I/O interface 612 provides an interface between the processing component 602 and a peripheral interface module. The above peripheral interface module may be a keyboard, a click wheel, a button, or the like. These buttons may include but not limited to, a home button, a volume button, a start button and a lock button.

The sensor component 614 includes one or more sensors for providing a state assessment in different aspects for the apparatus 600. For example, the sensor component 614 may detect an on/off state of the apparatus 600 and relative locations of components. For example, the components are a display and a keypad of the apparatus 600. The sensor component 614 may also detect a position change of the apparatus 600 or a component of the apparatus 600, presence or absence of a contact of a user on the apparatus 600, an orientation or acceleration/deceleration of the apparatus 600, and a temperature change of apparatus 600. The sensor component 614 may include a proximity sensor configured to detect presence of a nearby object without any physical touch. The sensor component 614 may further include an optical sensor, such as a CMOS or CCD image sensor used in an imaging application. In some examples, the sensor component 614 may further include an acceleration sensor, a gyroscope sensor, a magnetic sensor, a pressure sensor, or a temperature sensor.

The communication component 616 is configured to facilitate wired or wireless communication between the apparatus 600 and other devices. The apparatus 600 may access a wireless network based on a communication standard, such as WiFi, 4G, or a combination thereof. In an example, the communication component 616 receives a broadcast signal or broadcast related information from an external broadcast management system via a broadcast channel. In an example, the communication component 616 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 600 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

Figure 7:
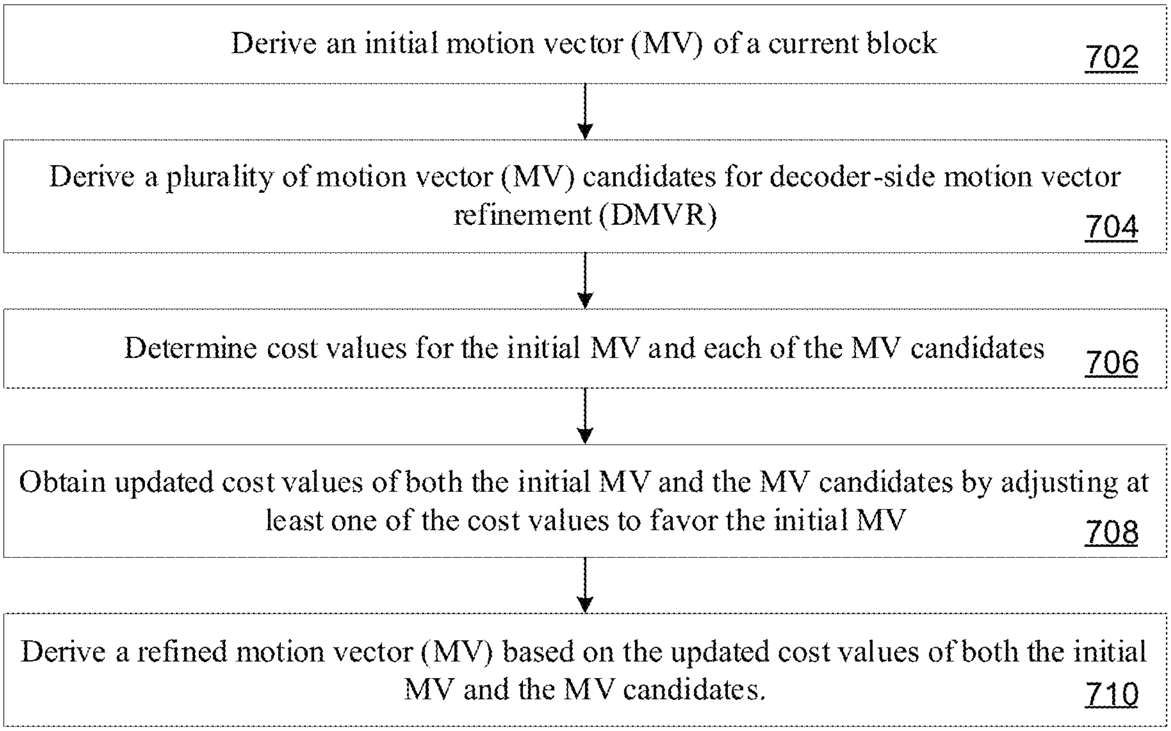
FIG. 7 is a flowchart illustrating an exemplary process of decoder-side motion vector refinement (DMVR) in video coding in accordance with some implementations of the present disclosure.

FIG. 7 is a flowchart illustrating an exemplary process of decoder-side motion vector refinement in video coding in accordance with some implementations of the present disclosure.

In step 702, the processor 620 derives an initial motion vector (MV) of a current block or a current coding unit (CU).

In step 704, the processor 620 derives a plurality of motion vector (MV) candidates for decoder-side motion vector refinement (DMVR).

In step 706, the processor 620 determines cost values for the initial MV and each of the MV candidates.

In step 708, the processor 620 obtains updated cost values of both the initial MV and the MV candidates by adjusting at least one of the cost values to favor the initial MV.

In step 710, the processor 620 derives a refined MV based on the updated cost values of both the initial MV and the MV candidates.

Adjusting at least one of the cost values may include decreasing the cost value of the initial MV by a first value determined using a predefined process; or increasing the cost values of the MV candidates by a second value determined using a predefined process.

In some examples, there is provided an apparatus for video coding. The apparatus includes one or more processors 620; and a memory 604 configured to store instructions executable by the one or more processors; where the one or more processors, upon execution of the instructions, are configured to perform a method as illustrated in FIG. 7.

In some other examples, there is provided a non-transitory computer readable storage medium 604, having instructions stored therein. When the instructions are executed by one or more processors 620, the instructions cause the processors to perform a method as illustrated in FIG. 7.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method of video encoding, comprising:

partitioning, by an encoder, a video frame into multiple blocks;

deriving, by the encoder, an initial motion vector (MV) of a current block in the multiple blocks;

determining, by the encoder and in a process of decoder-side motion vector refinement (DMVR), cost values for the initial MV and each of a plurality of MV candidates;

obtaining, by the encoder, an updated cost value for the initial MV by decreasing a cost value for the initial MV, or obtaining, by the encoder, updated cost values for the MV candidates by increasing cost values for the plurality of MV candidates; and deriving, by the encoder, a refined MV based on the updated cost value for the initial MV or the updated cost values for the MV candidates, wherein each MV of the initial MV and the plurality of MV candidates is associated with two reference blocks, wherein a respective cost value of the cost values is determined based on differences between reference samples in one of the two reference blocks and reference samples in the other of the two reference blocks.

2. The method of claim 1, wherein decreasing the cost value for the initial MV comprises:

decreasing the cost value for the initial MV by a first value determined using a predefined process.

3. The method of claim 2, wherein the first value is determined as 1/N of the cost value for the initial MV, where N is an integer value.

4. The method of claim 2, wherein the first value is determined as a constant value.

5. The method of claim 2, wherein the first value is determined according to coded information in the current block, the coded information comprising at least one or a combination of: coding block size, magnitude of motion vectors, a sum of absolute differences (SAD) for the initial MV, and relative position of a decoder-side motion vector refinement (DMVR) process unit.

6. The method of claim 5, wherein the first value is determined as 1/N of the cost value for the initial MV, where N is an integer value derived based on a block size of the current block.

7. The method of claim 5, wherein the first value is determined as 1/N of the cost value for the initial MV, where N is an integer value derived based on a distance between a center position of the DMVR process unit and a center position of the current block.

8. The method of claim 1, wherein increasing the cost values for the plurality of MV candidates comprises:

increasing the cost values for the plurality of MV candidates by a second value determined using a predefined process.

9. The method of claim 1, wherein the cost value for the initial MV is determined using fewer samples compared with samples used for determining the cost values for the plurality of MV candidates.

10. The method of claim 1, wherein deriving the refined MV comprises:

deriving the refined MV through a fractional sample refinement;

wherein the fractional sample refinement is simplified by removing comparison between sadMinus and sadCenter and comparison between sadPlus and sadCenter;

wherein sadMinus represents a value of E(−1,0) or E(0,−1), sadPlus represents a value of E(1,0) or E(0,1), and sadCenter represents a value of E(0,0), in solving a 2-D parabolic equation:

$$E(x,y)=A(x-x_{min})^2+B(y-y_{min})^2+C.$$

11. The method of claim 1, wherein deriving the refined MV comprises:

deriving the refined MV through a fractional sample refinement;

wherein the fractional sample refinement is simplified by limiting a fractional position to −4 or 4 for corner cases with 1/16th-pel MV accuracy, and by reducing an iteration count to 2 in a division-free equation solver.

12. The method of claim 1, wherein the cost values are sums of absolute differences (SADs).

13. An electronic device, comprising:

one or more processors; and a memory configured to store instructions executable by the one or more processors;

wherein the one or more processors, upon execution of the instructions, are configured to:

derive an initial motion vector (MV) of a current block in multiple blocks;

determine, in a process of decoder-side motion vector refinement (DMVR), cost values for the initial MV and each of a plurality of MV candidates;

obtain an updated cost value for the initial MV by decreasing a cost value for the initial MV, or obtain updated cost values for the MV candidates by increasing cost values for the plurality of MV candidates; and derive a refined MV based on the updated cost value for the initial MV or the updated cost values for the MV candidates, wherein each MV of the initial MV and the plurality of MV candidates is associated with two reference blocks, wherein a respective cost value of the cost values is determined based on differences between reference samples in one of the two reference blocks and reference samples in the other of the two reference blocks.

14. The apparatus of claim 13, wherein decreasing the cost value for the initial MV comprises:

decreasing the cost value for the initial MV by a first value determined using a predefined process.

15. The apparatus of claim 14, wherein the first value is determined as 1/N of the cost value for the initial MV, N being an integer value.

16. The apparatus of claim 13, wherein the cost values are sums of absolute differences (SADs).

17. A method of storing a bitstream, comprising:

generating a bitstream by performing an encoding method; and storing the bitstream, wherein the encoding method comprises:

partitioning a video frame into multiple blocks;

deriving an initial motion vector (MV) of a current block in the multiple blocks;

determining, in a process of decoder-side motion vector refinement (DMVR), cost values for the initial MV and each of a plurality of MV candidates;

obtaining an updated cost value for the initial MV by decreasing a cost value for the initial MV, or obtaining updated cost values for the MV candidates by increasing cost values for the plurality of MV candidates; and deriving a refined MV based on the updated cost value for the initial MV or the updated cost values for the MV candidates, wherein each MV of the initial MV and the plurality of MV candidates is associated with two reference blocks, wherein a respective cost value of the cost values is determined based on differences between reference samples in one of the two reference blocks and reference samples in the other of the two reference blocks.

18. The method of claim 17, wherein decreasing the cost value for the initial MV comprises decreasing the cost value for the initial MV by a first value determined using a predefined process.

19. The method of claim 18, wherein the first value is determined as 1/N of the cost value for the initial MV, N being an integer value.

* * * * *